United States Patent
Wang et al.

(10) Patent No.: US 11,973,241 B2
(45) Date of Patent: Apr. 30, 2024

(54) TRACTION BATTERY ENCLOSURE REINFORCEMENT ASSEMBLY AND REINFORCING METHOD

(71) Applicant: Ford Global Technologies, LLC, Dearborn, MI (US)

(72) Inventors: Yongcai Wang, Ann Arbor, MI (US); James Lawrence Swoish, Northville, MI (US); Melissa Kathryn Christensen, New Hudson, MI (US); Yunan Guo, Rochester Hills, MI (US); Ahteram Khan, Canton, MI (US); Micah Smith, Detroit, MI (US); Michael Luchtman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 17/495,373

(22) Filed: Oct. 6, 2021

(65) Prior Publication Data
US 2023/0106602 A1   Apr. 6, 2023

(51) Int. Cl.
*H01M 50/262* (2021.01)
*B60K 1/04* (2019.01)
*H01M 50/209* (2021.01)
*H01M 50/271* (2021.01)

(52) U.S. Cl.
CPC .......... *H01M 50/262* (2021.01); *B60K 1/04* (2013.01); *H01M 50/209* (2021.01); *H01M 50/271* (2021.01); *B60K 2001/0438* (2013.01); *H01M 2220/20* (2013.01)

(58) Field of Classification Search
CPC ....... H01M 50/262; H01M 50/209–271; F16B 1/0071; B60K 2001/0438
See application file for complete search history.

(56) References Cited

U.S. PATENT DOCUMENTS

| 212,659 | A | * | 2/1878 | Christie |
| 4,290,545 | A | * | 9/1981 | Whitney ................. B02C 13/28 228/139 |
| 10,118,475 | B2 | | 11/2018 | Sugizaki et al. |
| 10,876,570 | B1 | * | 12/2020 | Dayton ................. F16B 43/001 |
| 11,005,137 | B2 | | 5/2021 | Dunlap et al. |
| 2006/0088398 | A1 | * | 4/2006 | Lund .................... F16B 5/0225 411/398 |

(Continued)

FOREIGN PATENT DOCUMENTS

CN   207303162 U     5/2018
WO   WO-2021000340 A1 *  1/2021  ........ H01M 10/0413

*Primary Examiner* — Milton I Cano
*Assistant Examiner* — Albert Michael Hilton
(74) *Attorney, Agent, or Firm* — David B. Kelley; Carlson, Gaskey & Olds, P.C.

(57) ABSTRACT

A traction battery assembly according to an exemplary aspect of the present disclosure includes, among other things, a tray, at least one battery module, a lid secured to the tray to provide an enclosure having an interior that houses the at least one battery module, the lid having a lid aperture, and a reinforcement member is secured directly to the lid. The reinforcement member has a reinforcement member aperture. A fastener extends through the lid aperture and the reinforcement member aperture. The fastener is secured to a structure within the interior. The reinforcement member is secured directly to the lid separately from the fastener.

19 Claims, 3 Drawing Sheets

(56) References Cited

U.S. PATENT DOCUMENTS

2015/0322993 A1* 11/2015 Brewer .................. F16B 37/12
                                                         156/66
2017/0214013 A1*  7/2017 Benedict ............. H01M 50/264
2021/0359366 A1* 11/2021 Chen ................... H01M 50/262

* cited by examiner

TRACTION BATTERY ENCLOSURE REINFORCEMENT ASSEMBLY AND REINFORCING METHOD

TECHNICAL FIELD

This disclosure relates generally to securing portions of a traction battery and, more particularly, to securing areas of an enclosure relative to components within the enclosure.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A traction battery assembly according to an exemplary aspect of the present disclosure includes, among other things, a tray, at least one battery module, a lid secured to the tray to provide an enclosure having an interior that houses the at least one battery module, the lid having a lid aperture, and a reinforcement member is secured directly to the lid. The reinforcement member has a reinforcement member aperture. A fastener extends through the lid aperture and the reinforcement member aperture. The fastener is secured to a structure within the interior. The reinforcement member is secured directly to the lid separately from the fastener.

Another example of the foregoing assembly includes a cross-member disposed within the interior adjacent to the at least one battery module, and stanchion secured to the cross-member. The stanchion is disposed entirely within the interior. The structure is the stanchion.

In another example of any of the foregoing assemblies, the fastener threadably engages the stanchion.

In another example of any of the foregoing assemblies, the stanchion has a threaded bore. The fastener is received within the threaded bore when threadably engaging the stanchion.

In another example of any of the foregoing assemblies, the stanchion threadably engages the cross-member.

In another example of any of the foregoing assemblies, the stanchion is secured to an upwardly facing surface of the cross-member.

In another example of any of the foregoing assemblies, the reinforcement member is directly secured to an outer surface of the lid.

In another example of any of the foregoing assemblies, the reinforcement member is a circular disk.

In another example of any of the foregoing assemblies, the fastener has a shaft that extends through the lid aperture and the reinforcement member aperture. The reinforcement member has a diameter that is more than ten times greater than a diameter of the shaft.

In another example of any of the foregoing assemblies, the reinforcement member is a circular disk.

In another example of any of the foregoing assemblies, the reinforcement member and the lid are the same material.

In another example of any of the foregoing assemblies, the reinforcement member is made of a first material and the lid is made of a second material that is different the first material.

In another example of any of the foregoing assemblies, the reinforcement member and the lid are directly joined via a plurality of crimps.

In another example of any of the foregoing assemblies, the reinforcement member and the lid are directly joined via a plurality of welds.

A method of securing portions of a traction battery pack according to another exemplary aspect of the present disclosure includes, among other things, housing a component of the traction battery pack within an interior of an enclosure of a traction battery pack. The enclosure having a lid and a tray. The lid having a lid aperture. The method further including securing a stanchion to a cross-member within the interior, and directly connecting a reinforcement member to a lid of the enclosure. The reinforcement member having a reinforcement member aperture. The method still further including, after directly connecting the reinforcement member, securing a lid of the enclosure to the stanchion using a fastener that extends through the lid aperture and the reinforcement member aperture.

Another example of the foregoing method includes crimping the reinforcement member to the lid to directly connect the reinforcement member to the lid.

Another example of any of the foregoing methods includes welding the reinforcement member to the lid to directly connect the reinforcement member to the lid.

In another example of any of the foregoing methods, the reinforcement member is entirely outside the interior.

In another example of any of the foregoing methods, the reinforcement member is a circular disk.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Electrified vehicles include at least one traction battery pack. This disclosure relates to securing portions of the traction battery pack.

A typical traction battery pack includes an enclosure having an interior. Many components are held within the interior. Securing portions of the enclosure with attachments can help to reduce noise, vibration, harshness (NVH) issues associate with the enclosure. Areas of the enclosure near the attachments are strengthened using a reinforcement member.

Figure 1:
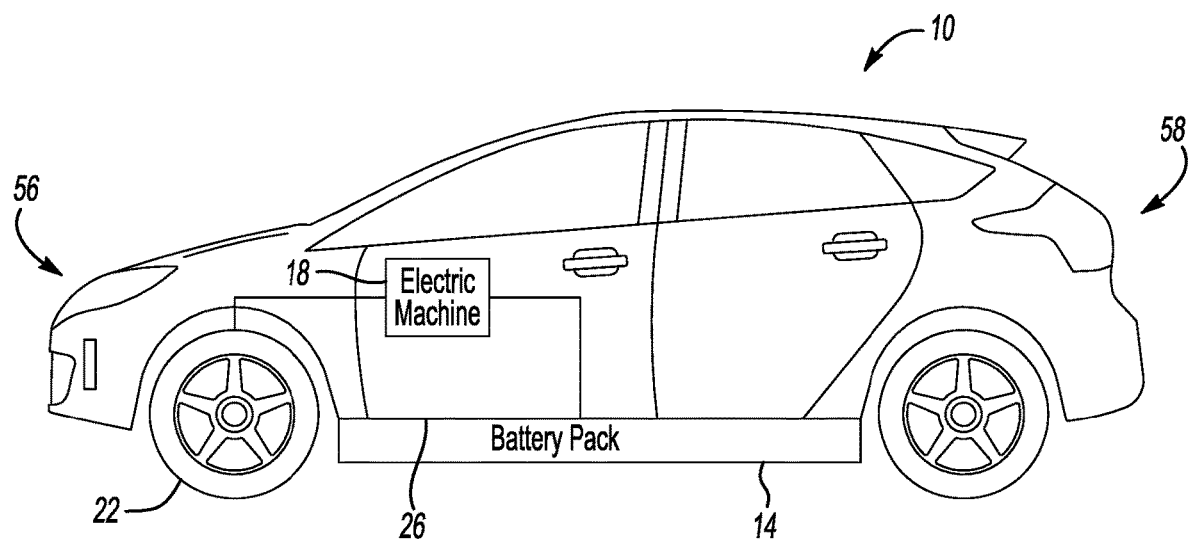
FIG. 1 illustrates a side view of an electrified vehicle.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22. The battery pack 14 can be a relatively high-voltage battery.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which selectively drives wheels using torque provided by an internal combustion engine instead, or in addition to, an electric machine. Generally, the electrified vehicle 10 could be any type of vehicle having a traction battery pack.

Figure 2:
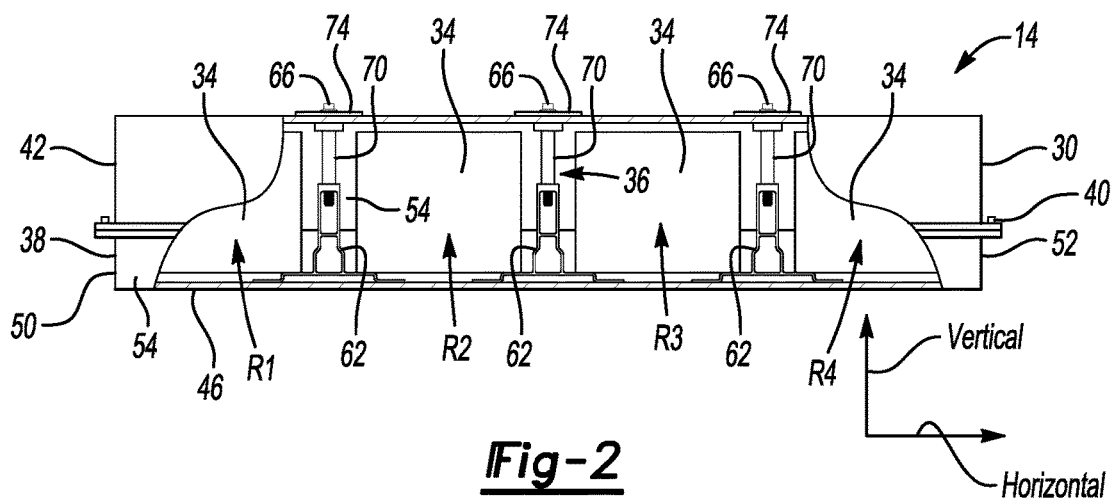
FIG. 2 illustrates a schematic view of a battery pack from the electrified vehicle of FIG. 1 with selected portions of an enclosure removed to show battery modules and cross-members within an interior of the enclosure.
Figure 3:
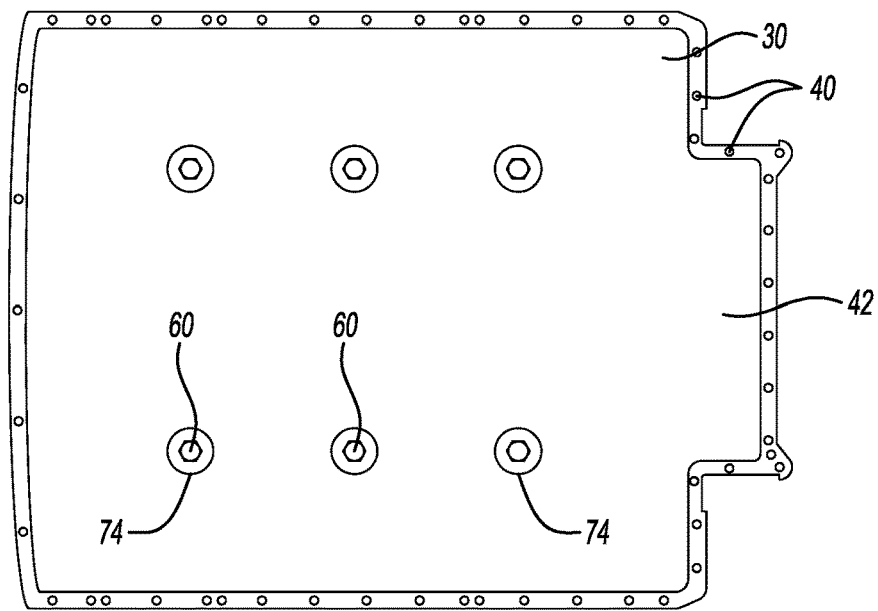
FIG. 3 illustrates a top view of the battery pack of FIG. 2.

Referring now to FIGS. 2 and 3 with continuing reference to FIG. 1, the battery pack 14 includes an enclosure 30 housing battery modules 34.

The enclosure 30, in the exemplary non-limiting embodiment includes a tray 38 and lid 42. The lid 42 is secured to the tray 38 to provide an interior 36. The battery modules 34 are located within the interior 36 along with other components. The lid 42, the tray 38, or both, can be a polymer or polymer-based material.

A plurality of mechanical fasteners 40 are distributed about a periphery of the battery pack 14. The mechanical fasteners 40 secure a flange of the tray 38 to a flange of the lid 42.

A sealing interface can be provided between the fasteners 40 and the interior 36. The fasteners 40 are disposed outside the sealing interface. That is, when the lid 42 is secured to the tray 38, a circumferentially continuous seal is maintained about a perimeter of the interior 36.

The exemplary tray 38 includes a floor 46, a forward wall 50, an aft wall 52, and opposing side walls 54 that extend horizontally from the forward wall to the aft wall 52. Vertical and horizontal, for purposes of this disclosure, are with reference to ground and the ordinary orientation of the electrified vehicle 10 during operation. Forward and aft are also with reference to the orientation of the electrified vehicle 10, that is, the forward wall 50 is closer to a front 56 of the electrified vehicle 10 than the aft wall 52. Also, the aft wall 52 is closer to a rear 58 of the electrified vehicle 10 than the forward wall 50.

A plurality of cross-members 62 are disposed within the interior 36 of the enclosure 30 adjacent to the battery modules 34. The cross-members 62 each extend longitudinally along a respective cross-member axis, which extends in a cross-vehicle direction and in a direction perpendicular to the plane of the page in FIG. 2. The cross-members 62, in the exemplary embodiment, extend from one of the side walls 54 to the opposing side wall 54. That is, in the exemplary embodiment, the cross-members 62 directly contact both of the side walls 54.

The cross-members 62 are each spaced a distance from each other and from both the forward wall 50 and the aft wall 52 of the tray 38. The cross-members 62 enhance the structural integrity of the battery pack 14. In the exemplary embodiment, the cross-members 62 are also utilized to support the battery modules 34 at a position where the battery modules 34 are elevated with respect to the floor 46 of the tray 38.

The battery modules 34, in the exemplary embodiment, are arranged in four rows R1, R2, R3, and R4. R1 is forward of rows R2-R4. R2 is forward of rows R3 and R4. Row R3 is forward of row R4. Along a longitudinal axis of the electrified vehicle 10, one of the cross-members 62 is used to support the battery modules 34 in rows R1 and R2. Another of the cross-members 62 is used to support the battery modules 34 in rows R2 and R3. The remaining cross-member 62 is utilized to support the battery modules 34 in rows R3 and R4.

Other exemplary battery packs could include other arrangements of battery modules and cross-members. Another battery pack could, for example, include more than four rows of battery modules. Yet another battery pack could include more than one vertical tier of battery modules.

Areas of the enclosure 30 that span a long way without being secured to another structure may be more prone to NVH issues than other areas of the enclosure 30. Securing areas of the enclosure 30 using fasteners that connect to structures inside the enclosure 30 can help the enclosure 30 withstand pressure increases within the interior 36. However, areas of the lid that are near these fasteners can experience relatively high loads when, for example, pressure within the interior 36 increases.

Figure 4:
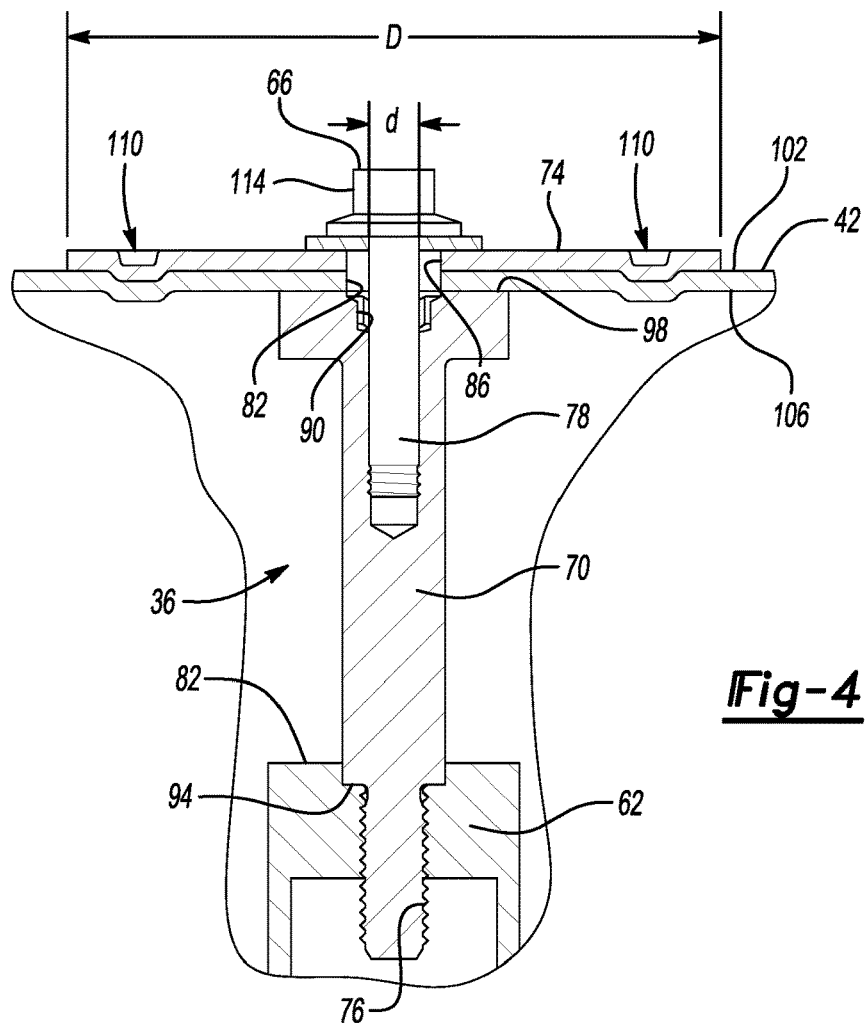
FIG. 4 a close-up section view of an assembly that couples the enclosure to one of the cross-members.
Figure 5:
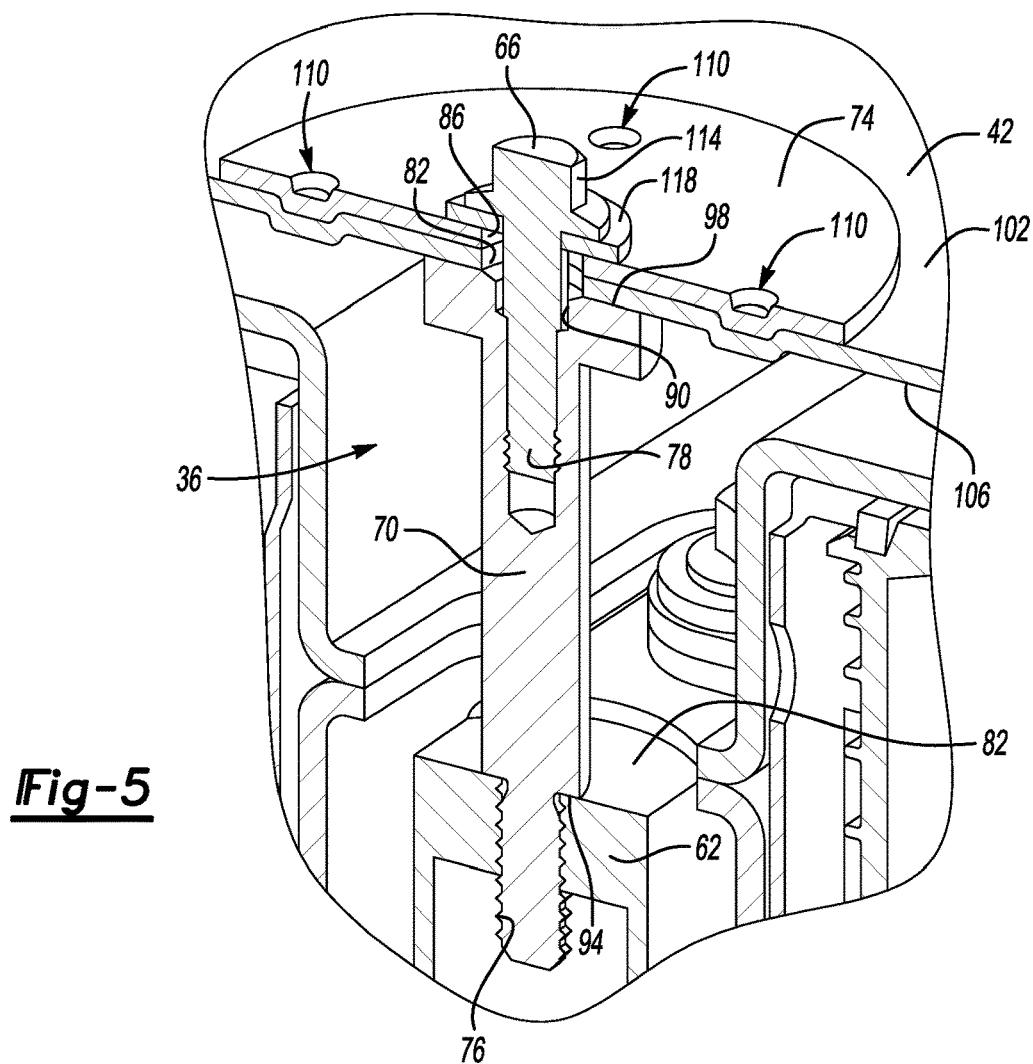
FIG. 5 illustrates a perspective view of the section from FIG. 4.

With reference now to FIGS. 4 and 5 and continuing reference to FIGS. 2 and 3, in the exemplary embodiment, a plurality of fasteners 66 secure the lid 42 to a respective stanchion 70 within the interior 36. Securing the lid 42 to the stanchions 70 can decrease the distances that the lid 42 spans thus helping to mitigate NVH issues associated with the lid 42, and helping to withstand higher pressures within the interior 36. In particular, reducing the distance that the lid 42 is required to span can increase local frequency modes of the lid 42 and prevent sagging of the lid 42. The stanchion 70 is disposed entirely within the interior 36 in this example.

The fasteners 66 each extend through a reinforcement member 74 that is directly secured to the lid 42. The reinforcement members 74 strengthen areas of the lid 42 near the fasteners 66 and can help these areas withstand higher stress loads.

When the fasteners 66 are secured to the stanchions 70, shafts 78 of the fasteners 66 each extend through a lid aperture 82 in the lid 42 and a reinforcement member aperture 86 in the reinforcement member 74.

The stanchions 70, in the exemplary embodiment, are secured to the cross-members 62. In particular, the stanchion 70 threadably engages the cross-member 62 and is received within a threaded bore 76 of the cross-members 62. The threaded bore 76 opens to an upwardly facing surface 84 of the cross-member 62. The stanchion 70 is secured to the upwardly facing surface 84.

To threadably secure the stanchion 70, the stanchion 70 includes an internal drive 90. Prior to securing the lid 42 to the tray 38, a torque tool can be used to torque down the stanchion 70 to the cross-member 62 until a lower shoulder 94 of the stanchion 70 rests against the upwardly facing surface 84 of the cross-member 62. The lid 42 can then be placed on the tray 38 such that the lid 42 rests on an upper surface 98 of the stanchion 70.

The upper surface 98 is a vertically uppermost surface of the stanchion 70 in this example. Vertical is with reference to ground an ordinary orientation of the battery pack 14 within the vehicle 10 during operation. The stanchion 70 is produced such that the upper surface 98 and the lower shoulder 94 have a high degree of parallelism, which can facilitate properly locating the lid 42.

Figure 6:
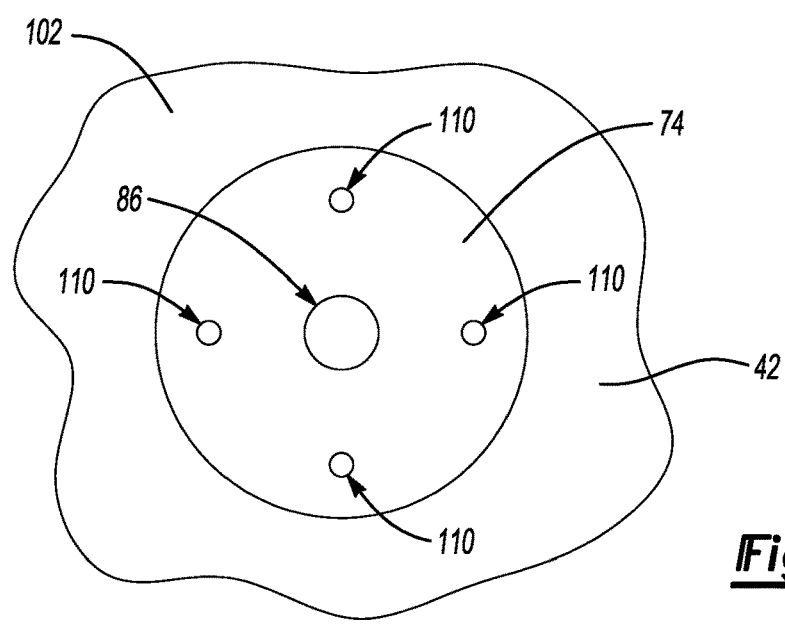
FIG. 6 illustrates close-up view of a reinforcement member secured to a lid of the battery pack in FIG. 2.

With reference to FIG. 6 and continuing reference to FIGS. 1-5, prior to inserting the fastener 66 through the lid aperture 82 and the reinforcement member aperture 86, the reinforcement member 74 is directly secured to the lid 42. The reinforcement member 74 is thus directly secured to the lid 42 separately from the fastener 66.

In this example, the reinforcement member 74 is directly secured to an outer surface 102 of the lid 42. The reinforcement member 74 is thus entirely outside of the interior 36. In another example, the reinforcement member could be directly secured to an inner surface 106 (FIG. 4) of the lid 42.

A crimping operation is used to directly connect the reinforcement member 74 to the lid 42. The crimping operation results in a plurality of crimps 110. Generally, crimping is considered the joining of two or more pieces of material by deforming. The bend or deformity is called the crimp. In another example, a plurality of welds directly connect the reinforcement member 74 to the lid 42.

In some examples, a sealant can be included between the reinforcement member 74 and the outer surface 102 of the lid 42. The sealant can be applied as an annular bead. The crimps 110 can then pass through the bead. The sealant can seal an interface between the outer surface 102 and the reinforcement member 74. In other examples, an adhesive backed tape can be used to seal the interface. The adhesive backed tape can also help to hold the reinforcement member 74 to the lid 42 during the crimping.

After placing the lid 42, the fastener 66 is inserted through the reinforcement member aperture 86 and the lid aperture 82. The fastener 66 is then torqued down to threadably engage the threaded bore 76 within the stanchion 70.

In this example, a head 114 of the fastener 66 clamps a washer 118, the reinforcement member 74, and the lid 42 against the upper surface 98 of the stanchion 70. The lid 42 is sandwiched between the head 114 and the upper surface 98 of the stanchion 70.

The washer 118 is a sealing washer that has a polymer-based portion. As the washer 118 is compressed, the polymer-based portion, in particular, helps to seals an interface between the fastener 66 and the reinforcement member 74.

The example reinforcement member 74 is a circular disk, but other shapes could be used. A diameter D (FIG. 4) of the reinforcement member 74 is more than ten times greater than a diameter d of the shaft 78. This relationship has been found to be particularly appropriate for strengthening areas of the lid 42 near the lid apertures 82.

The lid 42 is aluminum in this example, but other materials could be used. Further, in this example, the reinforcement member 74 is the same material as the lid 42. That is, the reinforcement member 74 and the lid 42 are made of common material. In some examples, the lid 42 and the reinforcement member 74 are both aluminum, but the reinforcement member 74 is a higher-grade aluminum. In some examples, the lid 42 is a first material and the reinforcement member 74 is a second material that is different that the first material.

A thickness of the lid 42 is nominally the same as a thickness of the reinforcement member 74 in this example. Thus, with the reinforcement member 74, the lid 42 is effectively a double layer.

Features of the disclosed examples include reducing sag of the lid or other areas of the enclosure by securing a lid to a structure within an enclosure. The areas that are secured are strengthened by a reinforcement member that is directly connected to the lid.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
   a tray;
   at least one battery module;
   a lid secured to the tray to provide an enclosure having an interior that houses the at least one battery module, the lid having a lid aperture;
   a reinforcement member secured directly to the lid, the reinforcement member having a reinforcement member aperture;
   a fastener that extends through the lid aperture and the reinforcement member aperture, the fastener secured to a structure within the interior, the reinforcement member secured directly to the lid separately from the fastener; and
   a washer clamped between the reinforcement member and a head of the fastener at a position outside the reinforcement member aperture.

2. The traction battery assembly of claim 1, further comprising a cross-member disposed within the interior adjacent to the at least one battery module, and a stanchion secured to the cross-member, the stanchion disposed entirely within the interior, wherein the structure is the stanchion.

3. The traction battery assembly of claim 2, wherein the stanchion has a threaded bore, wherein the fastener is received within the threaded bore when threadably engaging the stanchion.

4. The traction battery assembly of claim 2, wherein the stanchion is threadably engaged with the cross-member.

5. The traction battery assembly of claim 2, wherein the stanchion is secured to an upwardly facing surface of the cross-member.

6. The traction battery assembly of claim 1, wherein the reinforcement member is directly secured to an outer surface of the lid outside the interior.

7. The traction battery assembly of claim 1, wherein the reinforcement member is a circular disk.

8. The traction battery assembly of claim 1, wherein the fastener has a shaft that extends through the lid aperture and the reinforcement member aperture, wherein the reinforcement member has a diameter that is more than ten times greater than a diameter of the shaft.

9. The traction battery assembly of claim 1, wherein the reinforcement member and the lid are a common material.

10. The traction battery assembly of claim 1, wherein the reinforcement member is made of a first material and the lid is made of a second material that is different the first material.

11. The traction battery assembly of claim 1, wherein the reinforcement member and the lid are directly joined via a plurality of crimps.

12. The traction battery assembly of claim 1, wherein the reinforcement member and the lid are directly joined via a plurality of welds.

13. The traction battery assembly of claim 1, wherein the reinforcement member is entirely outside of the lid aperture.

14. The traction battery assembly of claim 1, wherein, within the lid aperture, the lid interfaces directly with the fastener.

15. The traction battery assembly of claim 1, wherein the reinforcement member is securable to the lid without the fastener.

16. The traction battery assembly of claim 1, wherein the lid directly contacts the structure.

17. The traction battery assembly of claim 1, wherein the washer is entirely outside the reinforcement member aperture.

18. The traction battery assembly of claim 1, wherein the washer is a sealing washer comprising a polymer-based portion.

19. The traction battery assembly of claim 1, wherein the washer has a washer aperture having a diameter that is less than a diameter of the reinforcement member aperture and less than a diameter of the lid aperture.

* * * * *